US009282257B2

(12) United States Patent
Ajito

(10) Patent No.: US 9,282,257 B2
(45) Date of Patent: Mar. 8, 2016

(54) IMAGE APPARATUS AND IMAGING METHOD

(71) Applicant: Olympus Corporation, Shibuya-ku, Tokyo (JP)

(72) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 101 days.

(21) Appl. No.: 14/145,877

(22) Filed: Dec. 31, 2013

(65) Prior Publication Data

US 2014/0192239 A1   Jul. 10, 2014

(30) Foreign Application Priority Data

Jan. 7, 2013  (JP) ................................. 2013-000407

(51) Int. Cl.
*H04N 5/243*  (2006.01)
*H04N 5/232*  (2006.01)

(52) U.S. Cl.
CPC ........... *H04N 5/243* (2013.01); *H04N 5/23209* (2013.01); *H04N 5/23212* (2013.01)

(58) Field of Classification Search
None
See application file for complete search history.

(56) References Cited

U.S. PATENT DOCUMENTS

| | | | | |
|---|---|---|---|---|
| 6,707,500 B1* | 3/2004 | Tamura et al. | ................. | 348/362 |
| 6,784,938 B1* | 8/2004 | Kidono et al. | ................. | 348/364 |
| 8,031,968 B2* | 10/2011 | Ishiga | ........................... | 382/275 |
| 9,001,262 B2* | 4/2015 | Onuki | ................ | H04N 5/23212 348/222.1 |
| 2002/0094131 A1* | 7/2002 | Shirakawa | .................... | 382/274 |
| 2002/0101531 A1* | 8/2002 | Kaneda | ......................... | 348/347 |
| 2002/0135688 A1* | 9/2002 | Niikawa | ........................ | 348/251 |
| 2003/0048362 A1* | 3/2003 | Watanabe et al. | .......... | 348/222.1 |
| 2003/0076424 A1* | 4/2003 | Minakuti et al. | ........... | 348/223.1 |
| 2004/0119877 A1* | 6/2004 | Shinozaki | ..................... | 348/362 |
| 2005/0089241 A1* | 4/2005 | Kawanishi et al. | ........... | 382/274 |
| 2005/0179788 A1* | 8/2005 | Okada et al. | ................ | 348/222.1 |
| 2005/0237417 A1* | 10/2005 | Miyasaka | ..................... | 348/335 |
| 2006/0008267 A1* | 1/2006 | Kim | ............................. | 396/213 |
| 2006/0147200 A1* | 7/2006 | Arimoto et al. | ............... | 396/529 |
| 2006/0181634 A1* | 8/2006 | Onozawa | ..................... | 348/345 |
| 2006/0232700 A1* | 10/2006 | Ito et al. | ........................ | 348/345 |
| 2008/0204574 A1* | 8/2008 | Kyung | ........................ | 348/229.1 |

(Continued)

FOREIGN PATENT DOCUMENTS

JP   61-79378   4/1986
JP   2000-244799   9/2000

(Continued)

OTHER PUBLICATIONS

Office Action from corresponding Japanese Patent Application No. 2013-000407, mailed Jul. 1, 2014 (3 pgs.), with translation (4 pgs.).

*Primary Examiner* — Michael Osinski
(74) *Attorney, Agent, or Firm* — John C. Pokotylo; Straub & Pokotylo

(57) ABSTRACT

An imaging apparatus includes an imaging element, a correction value calculating unit, and a correction unit. The imaging element images an object through a photographing lens to generate an image signal. The correction value calculating unit calculates correction values for a plurality of frequency components of the image signal, the correction values corresponding to an aperture value acquired when the object is imaged through the photographing lens. The correction unit corrects frequency characteristics of the plurality of frequency components in accordance with the correction values calculated.

4 Claims, 6 Drawing Sheets

(56) References Cited

U.S. PATENT DOCUMENTS

| | | | |
|---|---|---|---|
| 2008/0273812 A1* | 11/2008 | Fujita et al. | 382/274 |
| 2008/0297639 A1* | 12/2008 | Honjo et al. | 348/333.05 |
| 2008/0297640 A1* | 12/2008 | Honjo et al. | 348/333.05 |
| 2009/0059062 A1* | 3/2009 | Toguchi | 348/349 |
| 2010/0073547 A1* | 3/2010 | Ono | 348/340 |
| 2010/0086293 A1* | 4/2010 | Iwane | 396/91 |
| 2011/0017827 A1* | 1/2011 | Hayashi et al. | 235/462.11 |
| 2011/0085786 A1* | 4/2011 | Tamaki | 396/104 |
| 2011/0194851 A1* | 8/2011 | Hjelmstrom | 396/242 |
| 2011/0228163 A1* | 9/2011 | Isaka et al. | 348/362 |
| 2012/0013775 A1* | 1/2012 | Tsai | 348/252 |
| 2012/0327267 A1* | 12/2012 | Takahara | 348/231.99 |
| 2013/0016274 A1* | 1/2013 | Matsuo et al. | 348/345 |
| 2013/0038751 A1* | 2/2013 | Kurahashi et al. | 348/222.1 |
| 2014/0307127 A1* | 10/2014 | Yamashita | H04N 5/23209 348/231.6 |
| 2015/0062400 A1* | 3/2015 | Kawai | H04N 5/23212 348/302 |

FOREIGN PATENT DOCUMENTS

| | | |
|---|---|---|
| JP | 2004-146993 | 5/2004 |
| JP | 2006-323045 | 11/2006 |
| JP | 2012-093712 | 5/2012 |
| JP | 2012-256118 | 12/2012 |
| WO | WO 2009/119838 | 10/2009 |

* cited by examiner

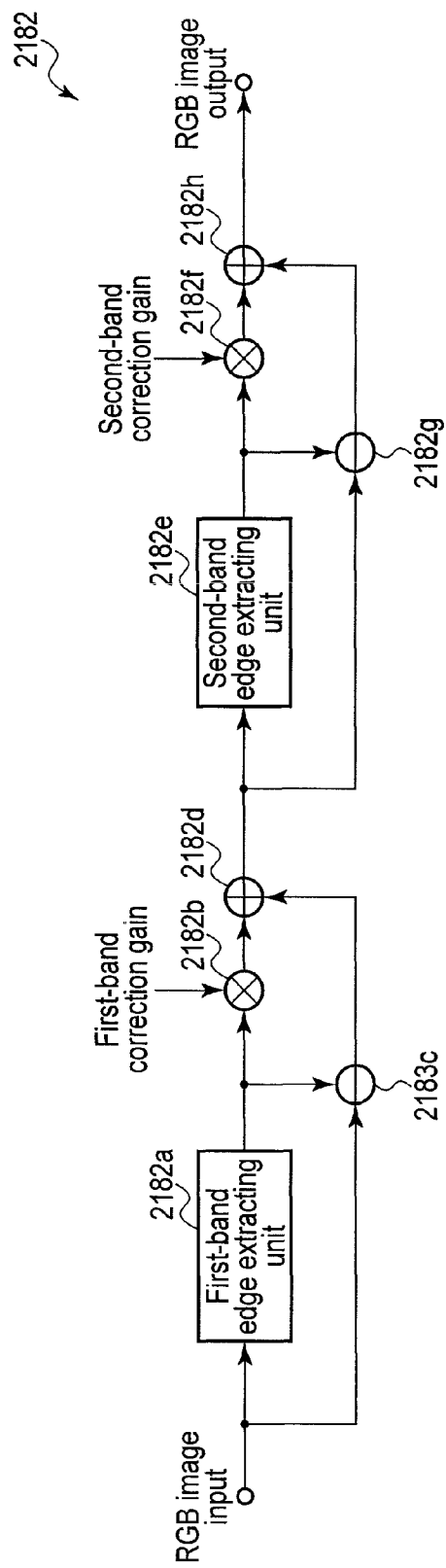
F I G. 2

| MTF characteristic table (%) | | Spatial frequency (LP/mm) | | | | | | | | |
|---|---|---|---|---|---|---|---|---|---|---|
| | | 0 | 20 | 40 | 60 | 80 | 100 | 120 | 140 | 160 |
| F-number | 2 | 100 | 98 | 87 | 76 | 65 | 60 | 55 | 50 | 45 |
| | 2.8 | 100 | 98 | 87 | 76 | 65 | 60 | 55 | 50 | 45 |
| | 4 | 100 | 98 | 85 | 72 | 60 | 53 | 46 | 40 | 34 |
| | 5.6 | 100 | 98 | 83 | 69 | 55 | 46 | 38 | 30 | 22 |
| | 8 | 100 | 96 | 79 | 62 | 45 | 36 | 28 | 20 | 12 |
| | 11 | 100 | 92 | 72 | 52 | 32 | 24 | 17 | 10 | 3 |
| | 16 | 100 | 82 | 60 | 39 | 18 | 12 | 6 | 0 | 0 |
| | 22 | 100 | 70 | 48 | 26 | 5 | 3 | 1 | 0 | 0 |
F I G. 5
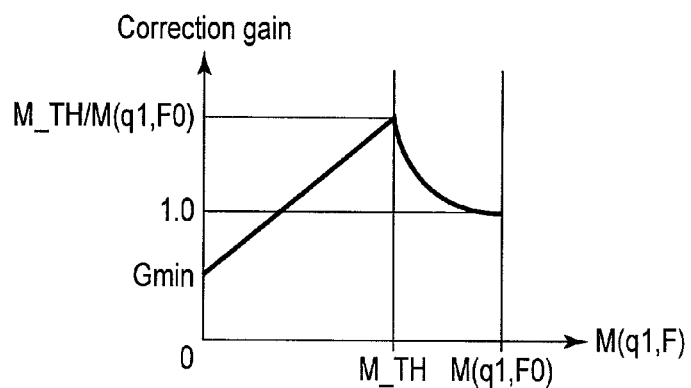
F I G. 6

| Correction gain table | | G_f1 | G_f2 |
|---|---|---|---|
| F-number | 2.0 | 1.0 | 1.0 |
| | 2.8 | 1.0 | 1.0 |
| | 4.0 | 1.1 | 1.0 |
| | 5.6 | 1.3 | 1.0 |
| | 8.0 | 1.6 | 1.1 |
| | 11.0 | 1.3 | 1.2 |
| | 16.0 | 1.0 | 1.5 |
| | 22.0 | 0.8 | 1.8 |
F I G. 7
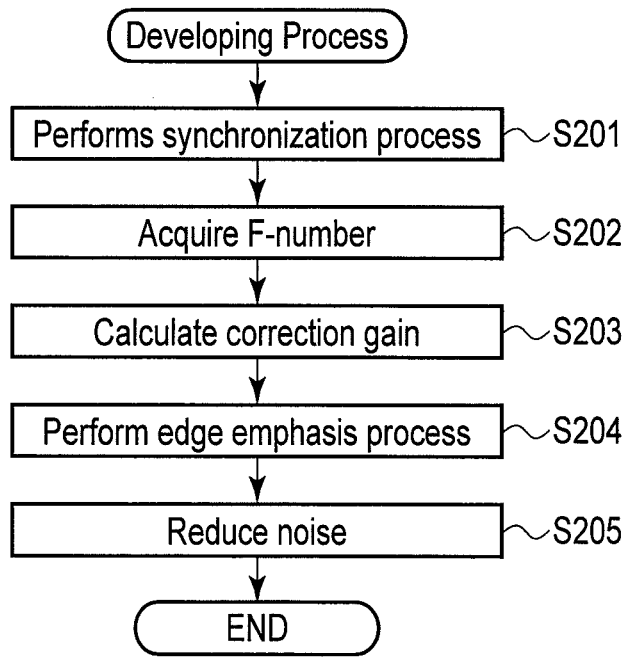
F I G. 8

IMAGE APPARATUS AND IMAGING METHOD

CROSS-REFERENCE TO RELATED APPLICATIONS

This application is based upon and claims the benefit of priority from the prior Japanese Patent Application No. 2013-000407, filed Jan. 7, 2013, the entire contents of which are incorporated herein by reference.

BACKGROUND OF THE INVENTION

1. Field of the Invention

This application relates to an imaging apparatus and an imaging method.

2. Description of the Related Art

In the photographing using an imaging apparatus such as a digital camera, a bright scene may be photographed at a low shutter-release speed or a plurality of objects at different distances may be photographed, all in focused state. In this case, the F number is be increased (thus reducing the aperture of the diaphragm), or the depth of focus is increased. If the F number or the depth of focus is increased, however, the modulation transfer function (MTF) of the lens will degrade by diffraction, ultimately rendering the resultant image unclear.

In this regard, Jpn. Pat. Appln. KOKAI Publication No. 2004-146993 discloses a recording apparatus, which uses a neutral density (ND) filter to lower the exposure. The diffraction is thus suppressed in this recording apparatus, preventing a large degradation of the lens MTF. In this recording apparatus, the image signal is corrected in accordance with the aperture set to the apparatus, thereby compensating for the resolution decrease resulting from the change in the lens MTF.

BRIEF SUMMARY OF THE INVENTION

According to a first aspect of the invention, an imaging apparatus comprises: an imaging element which images an object through a photographing lens to generate an image signal; a correction value calculating unit which calculates correction values for a plurality of frequency components of the image signal, the correction values corresponding to an aperture value acquired when the object is imaged through the photographing lens; and a correction unit which corrects frequency characteristics of the plurality of frequency components in accordance with the correction values calculated.

According to a second aspect of the invention, an imaging method comprises: imaging an object through a photographing lens by using an imaging element to generate an image signal; calculating correction values for a plurality of frequency components of the image signal by using a correction value calculating unit, the correction values corresponding to an aperture value acquired when the object is imaged through the photographing lens; and correcting frequency characteristics of the plurality of frequency components by using a correction value calculating unit in accordance with the correction values calculated.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram showing the configuration of an edge emphasis process unit;

FIG. 5 is a diagram showing an example of lens MTF characteristic information;

FIG. 6 is a graph illustrating an example of characteristic of first-band correction gain G f1(F);

FIG. 7 is a diagram showing an example of a correction table;

FIG. 8 is a flowchart explaining a developing process;

DETAILED DESCRIPTION OF THE INVENTION

An embodiment of the present invention will be described with reference to the accompanying drawings.

Figure 1:
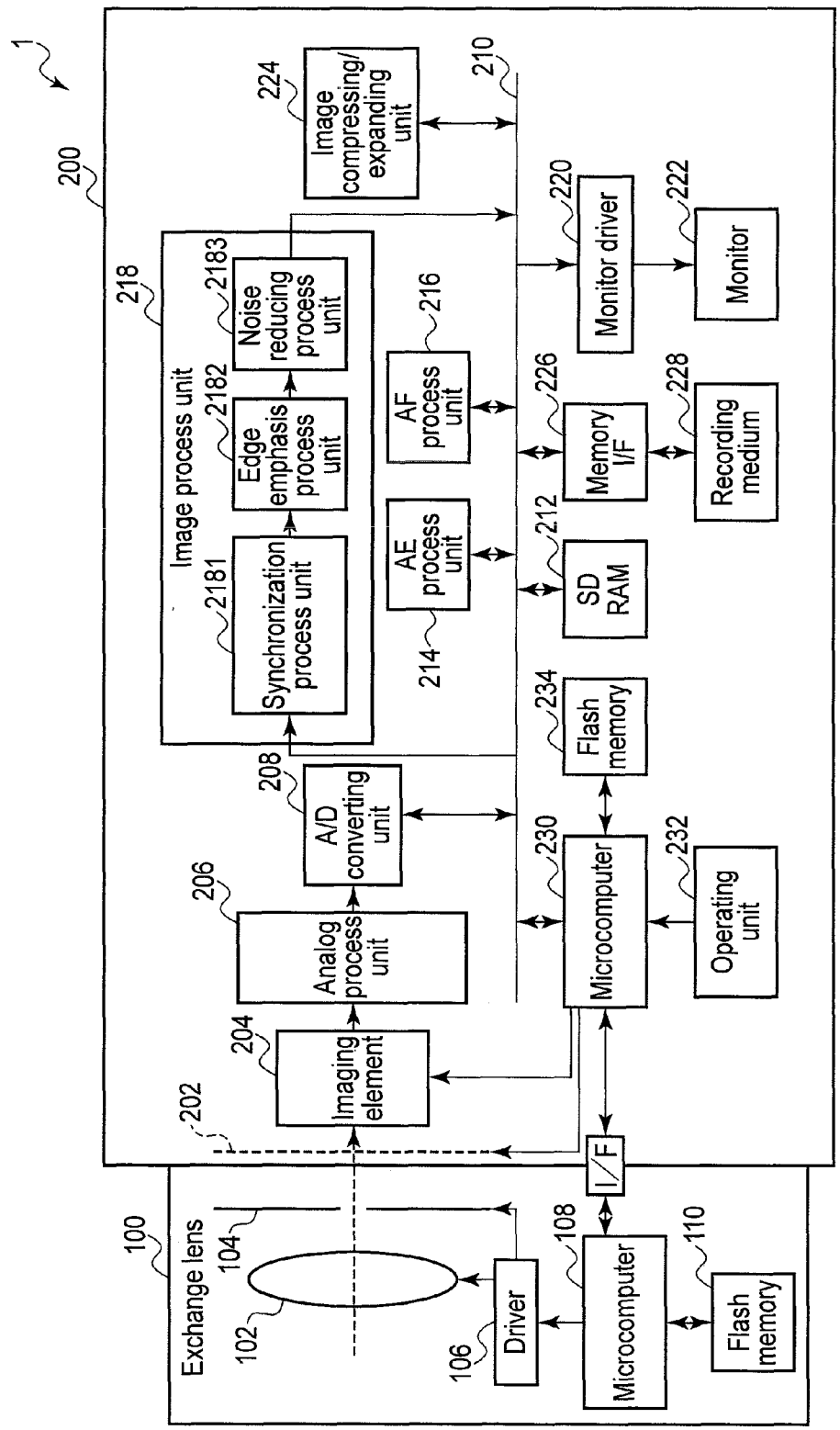
FIG. 1 is a block diagram showing the configuration of a digital camera exemplified as an imaging apparatus according to one embodiment of this invention.

FIG. 1 is a block diagram showing the configuration of a digital camera exemplified as an imaging apparatus according to one embodiment of this invention. The digital camera 1 shown in FIG. 1 is a lens-exchangeable type. Nonetheless, the embodiment is not limited to a lens-exchangeable digital camera. It may be a digital camera of lens-integrated type.

As shown in FIG. 1, the digital camera 1 includes an exchange lens 100 and a camera main body 200. The exchange lens 100 can be detached from the camera main body 200. As long as the exchange lens 100 remains attached to the camera main body 200, it can communicate with the camera main body 200 and can operate under the control of the camera main body 200.

The exchange lens 100 includes a photographing lens 102, a diaphragm 104, a driver 106, a microcomputer 108, and a flash memory 110.

The photographing lens 102 is an optical system designed to focus the light flux from an object (not shown) at the imaging element 204 incorporated in the camera main body 200. The photographing lens 102 may include a plurality of lenses such as a focus lens and a zoom lens.

The diaphragm 104 can be opened and closed to adjust the amount of light coming through the photographing lens 102. The driver 106 includes, for example, a motor. Under the control of the microcomputer 108, the driver 106 drives the focus lens and zoom lens in their optical axes in the photographing lens 102, and opens or closes the diaphragm 104.

When the exchange lens 100 is attached to the camera main body 200, the microcomputer 108 is connected by an interface (I/F) 112 to the microcomputer 230 provided in the camera main body 200 and can communicate with the microcomputer 230. When controlled by the microcomputer 230, the microcomputer 108 drives the driver 106. Further, the microcomputer 108 transmits, for example, the lens information about the exchange lens 100, which is stored in the flash memory 110, to the microcomputer 230 through the interface (I/F) 112.

The flash memory 110 stores the lens information about the photographing lens 102, such as aberration data of the photographing lens 102, and also stores the programs described to operate the exchange lens 100. Further, the flash memory 110 stores, as lens information, the lens frequency (lens MTF) characteristic information. The MTF characteristic information is the lens MTF value (%), i.e., the response to, for example, spatial frequency (namely, the contrast ratio between the contrasts the image signal represents before and after passing through the photographing lens 102). In this embodiment, the MTF characteristic information has been acquired beforehand for each possible aperture value (F-number) of the diaphragm 104, which may be set to the photographing lens 102.

The camera main body 200 includes a mechanical shutter 202, an imaging element 204, an analog process unit 206, an analog-to-digital (A/D) converting unit 208, a bus 210, a SDRAM 212, an AE process unit 214, an AF process unit 216, an image process unit 218, a motor driver 220, a monitor 222, an image compressing/expanding unit 224, a memory interface (I/F) 226, a microcomputer 230, an operating unit 232, and a flash memory 234.

The mechanical shutter 202 is configured to move to apply no light to the imaging element 204 and expose the imaging element 204 to light. As the mechanical shutter 202 is moved, the exposure time of the imaging element 204 is adjusted.

The imaging element 204 has a photoelectric conversion surface, on which the light flux coming from the object and focused by the photographing lens 102 is applied, forming an image of the object. The photoelectric conversion surface is composed a plurality of pixels arranged in the form of a two-dimensional matrix. A color filter is provided on the input side of the photoelectric conversion surface. So configured, the imaging element 204 converts the image (i.e., object image) corresponding to the light flux forming on the photoelectric conversion surface, to an electric signal (hereinafter called "image signal"). The image signal is output from the imaging element 204.

The imaging element 204 is selected from the various imaging elements known in the art, such as a CCD element and a CMOS element. The color arrangement of the color filter is selected from the various arrangements known, such as the Bayer arrangement. The imaging element 204 is not limited to a particular configuration in this embodiment. That is, this embodiment can use various types of imaging elements. The imaging element 204 may have the function of an electronic shutter that electronically controls the exposure time.

The analog process unit 206 performs an analog process, such as correlated double sampling (CDS) and automatic gain control (AGC), on the image signal generated by the imaging element 204. The A/D converting unit 208 converts the image signal analog-processed in the analog process unit 206, to a digital signal (hereinafter called "RAW image data"). The RAW image data is "raw" data that will be processed in the image process unit 218.

The bus 210 is the transfer path for transferring various data generated in the camera main body 200. The SDRAM 212 is a storage unit for temporarily store the various data generated in the camera main body 200. Thus, the SDRAM 212 is used as buffer memory while the image process unit 218 is processing image data.

The AE process unit 214 calculates the brightness of the object by using the image data (e.g., RAW image data). The brightness of the object may not only be calculated from the image data, but also be measured by, for example, a photometric sensor designed solely to measure brightness. The AF process unit 216 extracts high-frequency component signals from the image data (e.g., RAW image data) and integrates the high-frequency component signals, thereby acquiring a focus evaluation value for achieving automatic focusing (AF).

The image process unit 218 performs various image processing on the RAW image data, generating image data to be recorded or displayed. The image data to be recorded and the image data to be displayed differ from each other in the image-processing parameters used.

The image process unit 218 includes at least a synchronization process unit 2181, an edge emphasis process unit 2182, and a noise reducing process unit 2183. The image process unit 218 may include ordinary process blocks such as a white balance correcting unit for correcting the color balance of the image, a brightness characteristic converting unit for converting the brightness of the image and a color reproducing unit for adjusting the color reproduction in the image.

The synchronization process unit 2181 converts image data (e.g., such as the RAW image data output from the imaging element 204) to RGB image data in which each pixel corresponds to three primary colors. Note that the RAW image data is associated with the Bayer arrangement, in which each pixel corresponds to one color component. The edge emphasis process unit 2182, which functions as a correction unit, extracts a plurality of frequency component signals (i.e., edge signals) from the RGB image data, and processes the edge signals, correcting the frequency characteristic of each edge signal. The edge emphasis process unit 2182 will be later described in detail. The noise reducing process unit 2183 performs, for example, a coring process for removing noise components from the RGB image data.

The monitor driver 220 resizes the display image data acquired in the image process unit 218 or the display image data acquired by expanding the record image data in the image compressing/expanding unit 224, to the display size of the monitor 222. Then, the monitor driver 220 converts the display image data, so resized, to an image signal, which is output to the monitor 222. The monitor 222 is, for example, liquid crystals display (LCD). The monitor 222 displays the image represented by the image signal input from the monitor driver 220.

The image compressing/expanding unit 224 performs a still-picture compressing process of JPEG or TIFF system or a moving-picture compressing process of MPEG or H.264 system, on the record image data acquired in the image process unit 218. In reproducing the image, the image compressing/expanding unit 224 expands the record image data thus compressed.

The memory I/F 226 is the interface the microcomputer 230, etc. use to access a recording medium 228. The recording medium 228 is a memory card removably inserted in, for example, the camera main body 200. The recording medium 228 can hold an image file. The image file is a file in which header information is added to the record image data compressed by the image compressing/expanding unit 224. The recording medium 228 may be permanently held in the camera main body 200. (That is, the recording medium 228 need not be removal.)

The microcomputer 230 controls some components of the camera main body 200, such as the mechanical shutter 202, imaging element 204 and monitor driver 220. Further, the microcomputer 230 uses the object brightness calculated in the AE process unit 214, performing the AE process, and uses the AF evaluation value calculated in the AF process unit 216, performing the AF process. The microcomputer 230 can control the exchange lens 100 once the exchange lens 100 has been attached to the camera main body 200. In this embodiment, the microcomputer 230 has the function of a correction value calculating unit and can calculate a gain correction value for correcting edge signals in the edge emphasis process unit 2182.

The operating unit 232 includes various members the user may be operated to operate the other components of the camera main unit 200. More specifically, the operating unit 232 includes, for example, a release button, a moving-picture button, a reproduction button, a menu button and a power button. Some or all of these buttons may be virtual ones displayed on a touch panel, each activated if touched.

The release button is a two-stage switch including a first (1st) release switch and a second (2nd) release switch. If the release button is half depressed, the first release switch is turned on and the microcomputer 230 performs a photographing preparation such as the AF process. If the release button is fully depressed, the second release switch is turned on and the microcomputer 230 performs a photographing process such as still-picture recording. If the moving-picture button is pushed, it instructs the microcomputer 230 to start the sequence of photographing a moving-picture. If the moving-picture button is pushed while the moving picture data is being recorded, the microcomputer 230 terminates the moving picture photographing. The menu button may be pushed to instruct that a menu should be displayed. At the menu so displayed, the user can change the various settings made to the camera main body 200. If pushed, the reproduction button instructs the microcomputer 230 to reproduce the still-picture file or the moving-picture file. If pushed, the power button instructs the microcomputer 230 to turn on or off the power supply of the camera main body 200.

The flash memory 234 stores various parameters necessary for the camera main body 200, such as the parameters for driving the image process unit 218. The flash memory 234 also stores the various programs the microcomputer 230 may execute. In this embodiment, the flash memory 234 stores the pixel pitch information (i.e., infer-pixel distance measured in, for example, millimeters). The microcomputer 230 uses the pixel pitch information and the lens MTF characteristic information, calculating the gain correction value for use in the edge emphasis process performed by the edge emphasis process unit 2182. How the gain correction value is calculated will be explained later in detail.

FIG. 2 is a diagram showing, in detail, the configuration of the edge emphasis process unit 2182. As shown in FIG. 2, the edge emphasis process unit 2182 includes a first-band edge extracting unit 2182a, a first-band gain correcting unit 2182b, a first-band edge separating unit 2182c, a first-band synthesizing unit 2182d, a second-band edge extracting unit 2182e, a second-band gain correcting unit 2182f, a second-band edge separating unit 2182g, and a second-band synthesizing unit 2182h. So configured as shown in FIG. 2, the edge emphasis process unit 2182 corrects the RGB image data, more precisely the high-frequency component and low-frequency component of the RGB image data, by applying two different correction gains to these frequency components, respectively.

The first-band edge extracting unit 2182a is constituted by, for example, a band-pass filter, and extracts the edge signal corresponding to the first-band part of the RGB image data input. The first-band gain correcting unit 2182b corrects the edge signal extracted by the first-band edge extracting unit 2182a, by amplifying the edge signal in accordance with the first-band correction gain designated by the microcomputer 230. The first-band correction gain will be described later in detail. The first-band edge separating unit 2182c subtracts the edge signal extracted in the first-band edge extracting unit 2182a from the RGB image signal input, thereby acquiring RGB image data not including the edge signal. The first-band synthesizing unit 2182d synthesizes (adds) the output of the first-band gain correcting unit 2182b and the output of the first-band edge separating unit 2182c.

The second-band edge extracting unit 2182e is constituted by, for example, a band-pass filter, and extracts the edge signal corresponding to the second-band part of the RGB image data input from the first-band synthesizing unit 2182d. The second-band gain correcting unit 2182f corrects the edge signal extracted by the second-band edge extracting unit 2182e, by amplifying the edge signal in accordance with the second-band correction gain designated by the microcomputer 230. The second-band correction gain will be described later in detail. The second-band edge separating unit 2182g subtracts the edge signal extracted in the second-band edge extracting unit 2182e from the RGB image signal input from the first-band synthesizing unit 2182d, thereby acquiring RGB image data not including this edge signal. The second-band synthesizing unit 2182h synthesizes (adds) the output of the second-band gain correcting unit 2182f and the output of the second-band edge separating unit 2182g.

Figure 3:
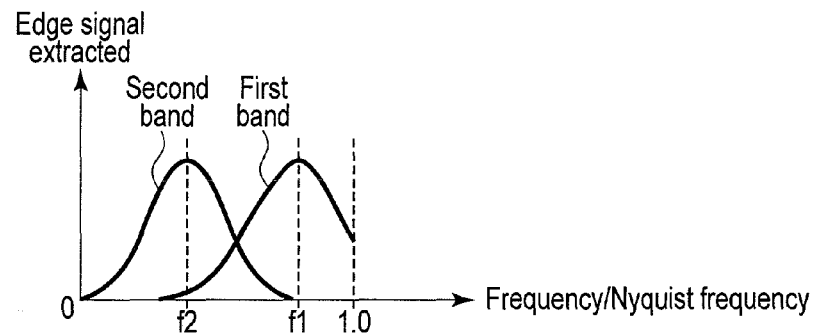
FIG. 3 is a diagram showing a first band and a second band.

FIG. 3 is a diagram showing the first band and the second band. Plotted on the horizontal axis in FIG. 3 is the spatial frequency of the RGB image data input. The spatial frequency is the value normalized with the Nyquist frequency. Plotted on the vertical axis in FIG. 3 is the value of the edge signal extracted from the RGB image data. As shown in FIG. 3, the first band f1 is a higher frequency band with respect to the second band f2. The first band f1 and second band f2 were set, for example, when the digital camera was designed.

Figure 4:
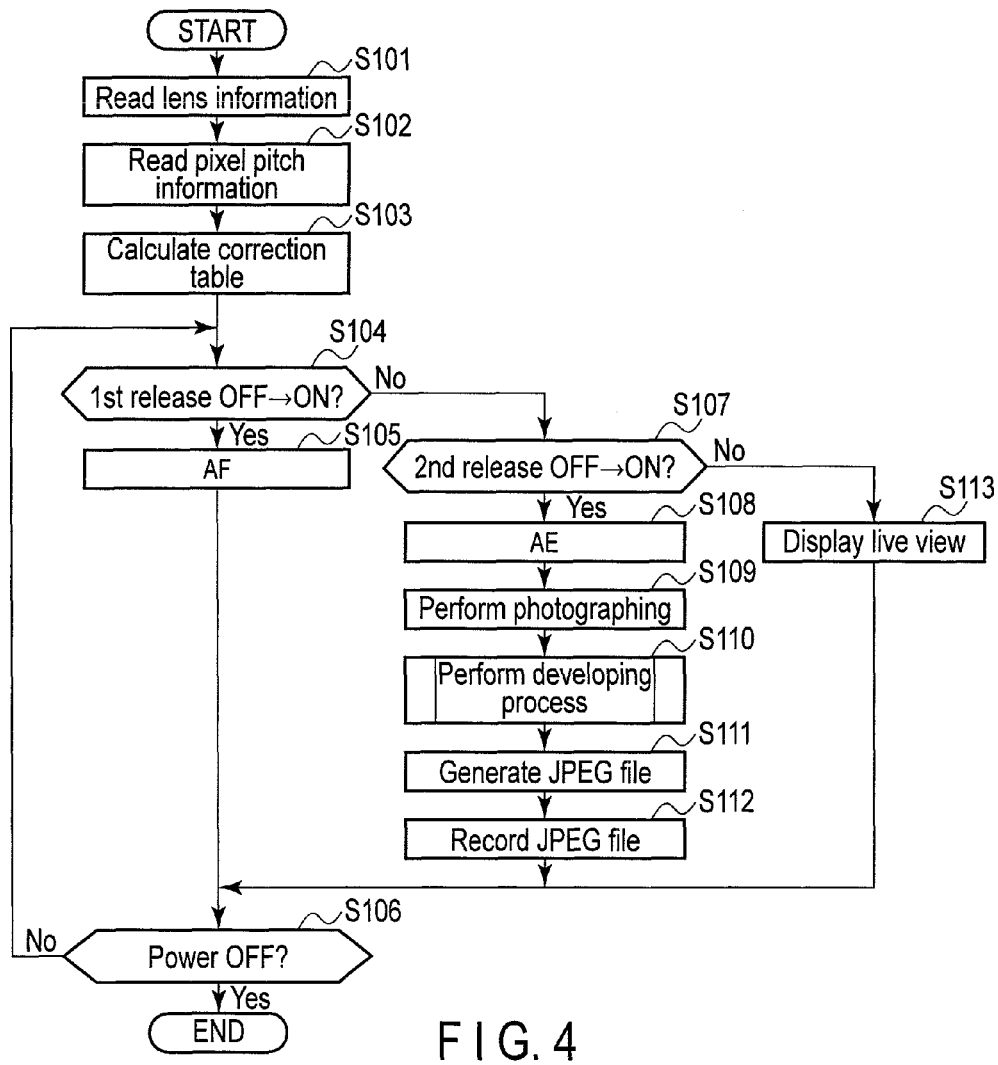
FIG. 4 is a flowchart explaining the main function of the digital camera, including an imaging method according to the embodiment of this invention.

How the digital camera operates will be explained. FIG. 4 is a flowchart explaining the main function of the digital camera, including an imaging method according to the embodiment of this invention. The sequence of operation shown in FIG. 4 is started when, for example, the power switch on the digital camera shown in FIG. 1 is turned on.

After the power switch on the digital camera is turned on, the microcomputer 230 reads the lens MTF characteristic information from the flash memory 110 incorporated in the exchange lens 100 (Step S101). FIG. 5 is a diagram showing an example of lens MTF characteristic information. As seen from FIG. 5, the lens MTF characteristic information is a table showing the relation between the diaphragm values (F-numbers) and the lens MTF values (%) associated with the changes in spatial frequency (line-pair (LP)/mm).

Then, the microcomputer 230 reads the pixel pitch information from the flash memory 234 (Step S102).

After reading the lens MTF characteristic information and pixel pitch information from the flash memory 234, the microcomputer 230 generates a correction table for use in the edge emphasis process, by using the lens MTF characteristic information and pixel pitch information (Step S103).

An exemplary method of generating the correction table will be explained. First, the peak frequency q1 (LP/mm) for the first band f1 and the peak frequency q2 (LP/mm) for the second band f2 are calculated as expressed by the following equations (1):

$$q1 = f1/(2 \times p)$$

$$q2 = f2/(2 \times p) \quad (1)$$

where p is the pixel pitch (mm).

Next, the microcomputer 230 acquires the lens MTF value (%) associated with the special frequencies q1 and q2 for each F-number, from the lens MTF characteristic information shown in FIG. 5. As shown in FIG. 5, the lens MTF characteristic information is the function of the spatial frequency and the F-number. Therefore, the lens MTF value acquired for the special frequency q1 will be denoted as M(q1, F), and the lens MTF value acquired for the special frequency q2 will be denoted as M(q2, F). "F" in either parenthesis is the F-number.

The spatial frequency q1 or q2 may not be identical to any special frequency shown in FIG. 5. In this case, the lens MTF value corresponding to q1 or q2 is calculated from the lens MTF values that can be referred to and correspond to the special frequencies similar to q1 and q2. This method of calculating the MTF value may be, for example, linear interpolation between the adjacent spatial frequencies that can be referred to.

After acquiring M(q1, F) and M(q2, F), the microcomputer 230 calculates the correction gain in the edge emphasis process. The method of calculating the correction gain will be explained, mainly how to calculate the first-band correction gain G_f1(F) that should be set to the first-band gain correcting unit 2182b.

If M(q1, F) is greater than the threshold value M_TH for the lens MTF value, the microcomputer 230 calculates the first-band correction gain G_f1(F) from the ratio of the lens MTF value M(q1, F0) for the reference F-number F0 to the lens MTF value M(q1, F). That is, the first-band correction gain G_f1(F) is calculated as follows:

$$G\_f1(F) = M(q1, F0)/(q1, F) \quad (2)$$

where the threshold value M_TH (0<M_TH<M(q1, F0)) is a value set through experiments conducted, for example, in designing the digital camera, and stored in the flash memory 234. The threshold value M_TH is therefore considered representing no image resolution. The reference F-number F0 is an F-number for which the resolution need not be corrected by means of the edge emphasis process. As seen from FIG. 5, the smaller the F-number (that is, the smaller the aperture), the more will the lens MTF value increase, in most cases. This means that the resolution will less decrease. In this case, the edge emphasis process need not be performed in order to correct the resolution. F0=2.8, i.e., maximum F-number, for example, is therefore used as reference F-number F0.

M(q1, F) may be smaller than the threshold value M_TH for the lens MTF value. If this is the case, the first-band correction gain G_f1(F) will be calculated as follows:

$$G\_f1(F) = [\{M(q1, F0)/M\_TH - Gmin\}/M\_TH] \times M(q1, F) + Gmin \quad (3)$$

where Gmin is the correction gain applied when the resolution is not present at all, and is a value set through experiments conducted, for example, in designing the digital camera, and stored in the flash memory 234. The value Gmin is equal to or smaller than the correction gain for the reference F-number F0, and is a correction gain that equalizes the lens MTF value to the lens MTF value M(q1, F0) at the reference F-number F0. Note that the correction gain may be set to 1.0 at the reference F-number F0 (if no correction need be performed).

The characteristic of the first-band correction gain G_f1(F) given by the equations (2) and (3) is diagrammed as shown in FIG. 6. As FIG. 6 shows, if the correction gain is calculated in accordance with the equations (2) and (3), the first-band correction gain G_f1(F) will change as indicated by a curve for the range exceeding the threshold value M_TH and will change as indicated by a straight line for the range not exceeding the threshold value M_TH. This method of calculating the correction gain is, however, no more than an example. The first-band correction gain G_f1(F) only needs to decrease as M(q1, F) increases in the range above the threshold value M_TH and to increase as M(q1, F) increases the range not above the threshold value M_TH.

A method of calculating the second-band correction gain G_f2(F) will be explained. The second-band correction gain G_f2(F) is calculated in accordance with the equation (2) only. This is because the second band is a lower frequency band than with respect to the first band.

The calculation described above results in a correction table shown in FIG. 7. As FIG. 7 shows, the correction table holds various F-numbers, various first-band correction gains G_f1(F) and various second-band correction gains G_f2(F), which are associated with one another. After calculating the correction table, the microcomputer 230 supplies the correction table to, for example, the SDRAM 212. The SDRAM 212 stores the correction table.

How the digital camera then operates will be explained, referring to FIG. 4 again. After generating the correction table, the microcomputer 230 determines whether the user has half depressed the release button at the operating unit 232 and the 1st release switch has thereby been turned on (Step S104).

If the 1st release switch is turned on in Step S104, the microcomputer 230 performs the AF process (Step S105). In the AF process, the microcomputer 230 causes the AF process unit 216 to acquire a focus evaluation value (i.e., AF evaluation value). Then, the microcomputer 230 evaluates the contrast on the basis of the focus evaluation value. While evaluating the contrast, the microcomputer 230 instructs the microcomputer 108 to drive the focus lens of the photographing lens 102 minutely. When the contrast becomes maximal thereafter, the microcomputer 230 instructs the microcomputer 108 to stop driving the focus lens. This AF process is an AF process of so-called "contrast system." Instead, the AF process may be the phase-difference AF process.

Then, the microcomputer 230 determines whether the power supply of the digital camera has been turned off or not (Step S106). In Step S106, if the power supply of the digital camera is not turned off, the process returns to Step S104, and Steps S104, S105 and S106 are repeated. In Step S106, if the power supply of the digital camera is turned off, the microcomputer 230 makes the camera terminate the process of FIG. 4.

In Step S104, if the 1st release switch of the release button is not turned on, the microcomputer 230 determines whether the user has fully depressed the release button at the operating unit 232, and the 2nd release switch has thereby been turned on (Step S107).

If the 2nd release switch of the release button is turned on (Yes in Step S107), the microcomputer 230 performs the AE process (Step S108). In the AE process, the microcomputer 230 causes the AE process unit 214 to calculate the brightness of the object. Thereafter, the microcomputer 230 determines the ISO sensitivity, F-number and shutter-release speed, all for photographing process, in accordance with the object brightness calculated by the AE process unit 214.

Next, the microcomputer 230 performs the photographing process (Step S109). The microcomputer 230 sets a gain control value (i.e., amplification factor) for use in the analog process unit 206, on the basis of the ISO sensitivity determined in the AF process, and then transmits to the microcomputer 108 the F-number determined in the AE process. Thereafter, the microcomputer 230 drives the mechanical shutter 202 at the shutter-release speed determined in the AE process, at the same time the diaphragm 104 is driven under the control of the microcomputer 108. The exposure of the imaging element 204 is thereby controlled. In the photographing process so performed, the RAW image data is stored in the SDRAM 212.

After performing the photographing process, the microcomputer 230 performs a developing process on the RAW image data acquired in the photographing process and stored in the SRDRAM 212 (Step S110). The developing process will be described later in detail.

After performing the developing process, the microcomputer 230 compresses the RGB image data stored in the SDRAM 212 after the developing process (or performs JPEG compressing process) (Step S111). Then, the microcomputer 230 reads the still-picture data (i.e., RGB image data) from the SDRAM 212 and adds predetermined header information to the still-picture data, generating a still-picture file. The still-picture file is recorded in the recording medium 228 (Step S112). Thereafter, the microcomputer 230 makes the process go to Step S106.

In Step S107, if the 2nd release switch of the release button is not turned on, the microcomputer 230 performs a live-view display process (Step S113). Then, the microcomputer 230 makes the process go to Step S106. In the live-view display process, the microcomputer 230 performs a photographing process that uses an electronic shutter, in order to display a live view. After performing the photographing process using the electronic shutter, the microcomputer 230 causes the image process unit 218 to process the RAW image data acquired in the photographing process and stored in the SDRAM 212. Thereafter, the microcomputer 230 instructs the monitor driver 220 to display the display image data (i.e., result of image process) that is stored in the SDRAM 212. So instructed, the monitor driver 220 reads the display image data from the SDRAM 212 and converts the display image data to a video signal. The video signal is output to the monitor 222. The monitor 222 displays the image represented by the video signal. Seeing the image displayed live on the monitor 222, the user can check the picture composition.

FIG. 8 is a flowchart explaining the developing process. As shown in FIG. 8, the synchronization process unit 2181 performs a synchronization process (Step S201). In the synchronization process, the synchronization process unit 2181 performs interpolates the RAW image data, converting the RAW image data in which each pixel has one color component R, G or B, to RGB image data in which each pixel has three color components R, G and B. If the RAW image data does not represent an image composed of pixels of the Bayer arrangement, each having one color component, the synchronization process need not be performed.

After performing the synchronization process, the microcomputer 230 acquires the F-number determined in the AE process performed immediately before the photographing process (Step S202). Then, the microcomputer 230 calculates the correction gain from the acquired F-number (Step S203).

More specifically, the microcomputer 230 acquires the first-band correction gain G_f1(F) and second-band correction gain G_f2(F) associated with the F value, from the correction table of FIG. 7.

On receiving the correction gain, the edge emphasis process unit 2182 performs the edge emphasis process (Step S204).

In the edge emphasis process, the first-band edge extracting unit 2182a extracts a first-band edge signal from the RGB image data input. The first-band gain correcting unit 2182b amplifies the first-band edge signal extracted by the first-band edge extracting unit 2182a, by using the first-band correction gain G_f1(F) designated by the microcomputer 230. The first-band edge signal so amplified is input to the first-band synthesizing unit 2182d. Meanwhile, the first-band edge separating unit 2182c removes, from the RGB image data input to it, the edge signal the first-band edge extracting unit 2182a has extracted. The RGB image data, now containing no edge signal, is input to the first-band synthesizing unit 2182d. The first-band synthesizing unit 2182d adds, to the RGB image data, the first-band correction edge signal acquired in the first-band gain correcting unit 2182b, synthesizing the first-band correction edge signal with the RGB image data. The first-band component of the RGB image data is thereby corrected in terms of frequency characteristic.

Then, the second-band edge extracting unit 2182e extracts a second-band edge signal from the RGB image data input to the first-band synthesizing unit 2182d. The second-band gain correcting unit 2182f amplifies the second-band edge signal extracted by the second-band edge extracting unit 2182e, by using the second-band correction gain G_f2(F) designated by the microcomputer 230. The second-band edge signal so amplified is input to the second-band synthesizing unit 2182h. In the meantime, the second-band edge separating unit 2182g removes, from the RGB image data input to it, the edge signal the second-band edge extracting unit 2182e has extracted. The RGB image data, now containing no edge signal, is input to the second-band synthesizing unit 2182h. The second-band synthesizing unit 2182e adds, to the RGB image data, the second-band correction edge signal acquired in the second-band gain correcting unit 2182f, synthesizing the second-band correction edge signal with the RGB image data. The second-band component of the RGB image data is thereby corrected in terms of frequency characteristic.

The edge emphasis process unit 2182 of FIG. 2 first processes the first-band RGB image data (i.e., high frequency band data), and then the second-band RGB image data (i.e., low frequency band data). The edge emphasis process unit 2182 may, however, be configured to process the first-band RGB image data and the second-band RGB image data, in parallel.

After the edge emphasis process unit 2182 performs the edge emphasis process, the noise reducing process unit 2183 performs a noise reducing process (Step S205). More precisely, the noise reducing process unit 2183 first divides the edge-emphasized RGB image data into components of different frequencies, and then performs, for example, a coring process on these data components, thereby reducing the noise components of the image data. The RGB image data subjected to noise reduction is stored, as record image data, in the SDRAM 212. Thus ends the process sequence of FIG. 8.

As described above, in this embodiment the image data is split into the image data of a high-frequency component and the image data of a low-frequency component, and an edge emphasis process is performed for each data component by using different correction gain to prevent the image resolution decrease in spite of the decrease in the lens MTF value. A resolution decrease, if any, resulting from a large change in the aperture during the photographing, can therefore be appropriately compensated for.

Figure 9A:
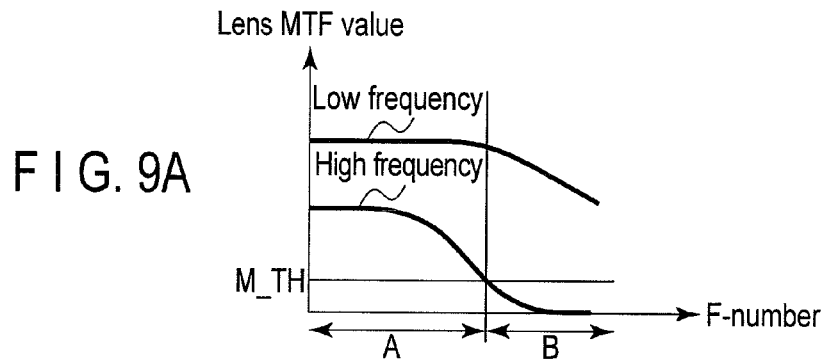
FIG. 9A is a diagram showing how the resolution of an image is generally decreased as the F-number changes.

The advantage of this embodiment will be explained. FIG. 9A is a diagram showing how the resolution of an image decreases (or how the lens MTF value changes) as the F-number changes.

As seen from FIG. 9A, in frequency range A in which the F-number is small (because the aperture of the diaphragm is large), the lens MTF value of the high-frequency component gradually decreases as the F-number increases (as the aperture of the diaphragm decreases). By contrast, the lens MTF value of the low-frequency component scarcely changes even if the F-number changes.

Figure 9B:
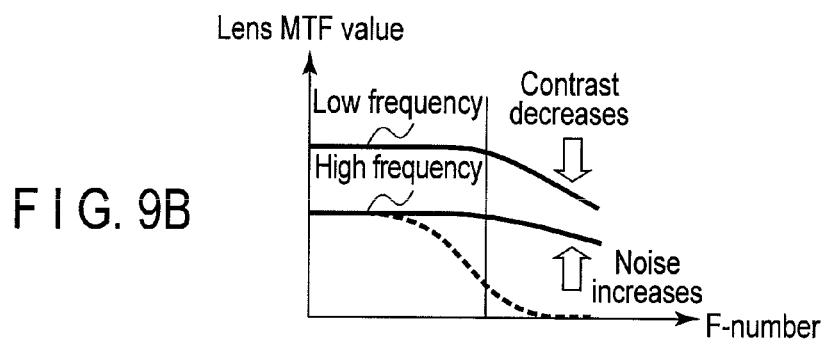
FIG. 9B is a diagram showing how the resolution of an image changes if a specific frequency component is extracted and edge emphasis is then performed in accordance with the F-number.

As shown in FIG. 9B, in frequency range B in which the F-number is large (because the aperture of the diaphragm is small), the lens MTF value of the high-frequency component decreases to almost zero. This means that the high-frequency component has been lost due to the diffraction limit. By contrast, the lens MTF value of the low-frequency component gradually decreases as the F-number increases.

Assume that only a specific frequency component is extracted and subjected to the edge emphasis process in accordance with the F-number. If the edge emphasis process is performed on a high-frequency component only, the decrease of resolution can be correctly suppressed as shown in FIG. 9B, for any small F-number (i.e., large aperture). For any large F-number (i.e., small aperture), however, a high-frequency component scarcely exists, and only the noise will be amplified in the edge emphasis process as shown in FIG. 9B.

If the edge emphasis process is performed to correct a low-frequency component only, only the noise will never be amplified so long as the F-number is large (that is, if the aperture of the diaphragm is small). However, the resolution decrease cannot be reduced for the high-frequency component having a small F-number (i.e., large aperture).

Figure 10A:
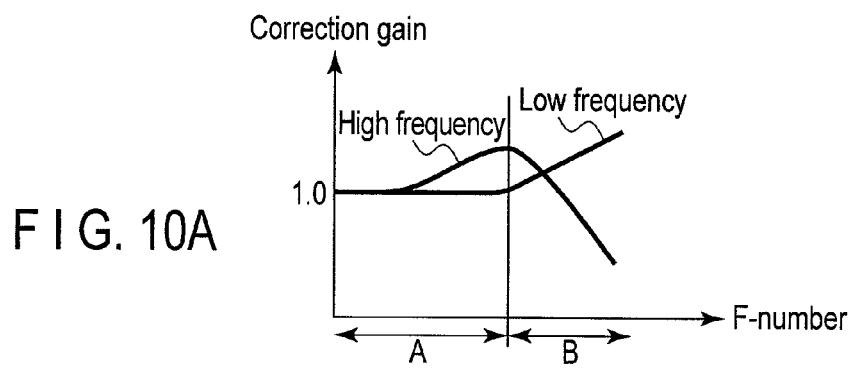
FIG. 10A is a diagram showing an exemplary gain correction value calculated by a method according to the embodiment of this invention.
Figure 10B:
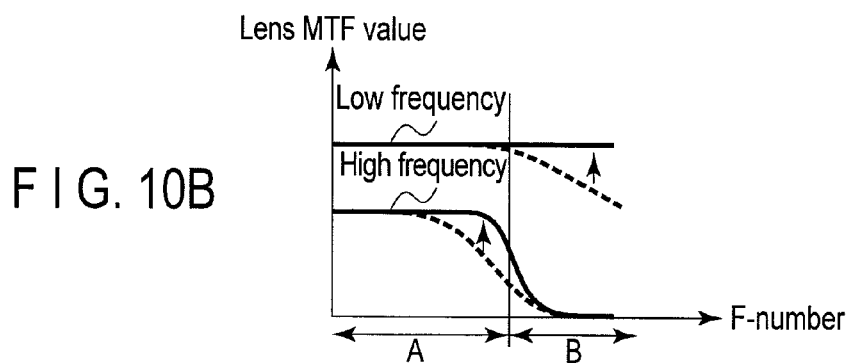
FIG. 10B is a diagram showing how the resolution of an image changes if edge emphasis is performed by a method according to the embodiment of this invention.

In this embodiment, it is determined whether the lens MTF value is larger than the threshold value M_TH, thereby determining whether the F-number falls within the range A or B at present. As shown in FIG. 10A, the gain correction value is increased as the F-number increases in the range A, wherein the lens MFT value is equal to or smaller than the threshold value M_TH, and is decreased as the F-number increases in the range B, wherein the lens MFT value exceeds the threshold value M_TH. Noise can therefore be suppressed in the range where F-number is large, while compensating for the resolution decrease of any high-frequency component in the small F-number range as shown in FIG. 10B.

For any low-frequency component, the gain correction value is increased as the F-number increases in the range B, wherein the F-number is relatively large. As a result, the resolution decease due to the increase in the F-number in the large F-number range can be suppressed as shown in FIG. 10B.

Thus, this embodiment can appropriately compensate for the image resolution decrease even if the aperture of the diaphragm realty changes in the photographing process.

In this embodiment, two frequency components, i.e., high-frequency component and low-frequency component, are extracted from the image data. Instead, three or more frequency components may be extracted and subjected to different edge emphasis processes in this invention.

The embodiment described above is a digital camera which includes an exchange lens and in which the resolution decrease is compensated for. In a digital camera of lens-integrated type, the lens MTF characteristic information can be acquired at the time of designing the digital camera. The correction table can therefore be generated when the digital camera is designed. If the correction table is stored in the flash memory 234, no correction tables need be generated in the photographing process. In this case, Step S103 shown in FIG. 4 can be omitted.

In the embodiment described above, the edge emphasis process is performed on the RGB image data. Alternatively, the RGB image data may be divided into brightness data and color-difference data, and the edge emphasis process may then be performed on the brightness data only.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging element which images an object through a photographing lens to generate an image signal;
   a correction value calculating unit which calculates correction values for a plurality of frequency components of the image signal, the correction values corresponding to an aperture value acquired when the object is imaged through the photographing lens; and
   a correction unit which corrects frequency characteristics of the plurality of frequency components in accordance with the correction values calculated,
   wherein the correction value calculating unit calculates the correction value for each of the frequency components from lens frequency characteristic information set in association with each of the aperture values for the photographing lens and pixel pitch information about the imaging element, and
   wherein the frequency components are a high-frequency component and a low-frequency component, and the correction value calculating unit calculates, for the high-frequency component, a correction value that decreases as the aperture value increases in a range above a value predetermined by the lens frequency characteristic information, and for the low-frequency component, a correction value that increases as the aperture value increases in the range above the value predetermined by the lens frequency characteristic information.

2. The imaging apparatus according to claim 1, wherein the photographing lens is an exchange lens made detachable from a main body of the imaging apparatus and having a memory storing the lens frequency characteristic information, and a memory is further provided, which stores the pixel pitch information.

3. The imaging apparatus according to claim 1, wherein the correction unit extracts edge signals corresponding to the frequency components, respectively, and corrects the edge signals in accordance with the correction values calculated, thereby to acquire correction edge signals, and uses the correction edge signals, thereby to correct the frequency characteristics of the frequency components of the image signal.

4. An imaging method comprising:
   imaging an object through a photographing lens by using an imaging element to generate an image signal;
   calculating correction values for a plurality of frequency components of the image signal by using a correction value calculating unit, the correction values corresponding to an aperture value acquired when the object is imaged through the photographing lens; and correcting frequency characteristics of the plurality of frequency components by using a correction unit in accordance with the correction values calculated, wherein the act of calculating correction values calculates the correction value for each of the frequency components from lens frequency characteristic information set in association with each of the aperture values for the photographing lens and pixel pitch information about the imaging element, and wherein the frequency components are a high-frequency component and a low-frequency component, and the act of calculating correction values calculates, for the high-frequency component, a correction value that decreases as the aperture value increases in a range above a value predetermined by the lens frequency characteristic information, and for the low-frequency component, a correction value that increases as the aperture value increases in the range above the value predetermined by the lens frequency characteristic information.

* * * * *